United States Patent
Till

[15] 3,650,682
[45] Mar. 21, 1972

[54] PROCESS FOR THE PRODUCTION OF ALKALI METAL PERBORATES

[72] Inventor: Heinrich Till, Tyrol, Austria

[73] Assignee: Sandoz Limited, Basel, Switzerland

[22] Filed: July 15, 1969

[21] Appl. No.: 841,978

Related U.S. Application Data

[63] Continuation-in-part of Ser. No. 594,988, Nov. 17, 1966, abandoned, Continuation-in-part of Ser. No. 753,763, Aug. 19, 1968, abandoned, Continuation-in-part of Ser. No. 837,983, May 15, 1969, abandoned, Continuation-in-part of Ser. No. 551,537, May 20, 1966, abandoned.

[30] Foreign Application Priority Data

| | | |
|---|---|---|
| May 20, 1965 | Austria | A 4586/65 |
| July 14, 1966 | Austria | A 10310/66 |
| Nov. 7, 1966 | Austria | A 10268/66 |
| July 23, 1968 | Switzerland | 11050/68 |
| July 16, 1968 | Austria | A 6848/68 |

[52] U.S. Cl. ................................................................23/60
[51] Int. Cl. ........................................................C01b 15/12
[58] Field of Search .......................................................23/60

[56] References Cited

UNITED STATES PATENTS

| | | | |
|---|---|---|---|
| 3,348,907 | 10/1967 | Pellens et al. | 23/60 |
| 3,375,198 | 3/1968 | Rosenfelder | 23/60 |

FOREIGN PATENTS OR APPLICATIONS

| | | | |
|---|---|---|---|
| 540,130 | 8/1955 | Belgium | 23/60 |
| 1,367,499 | 6/1964 | France | 23/60 |
| 1,498,350 | 9/1967 | France | 23/60 |
| 1,504,848 | 10/1967 | France | 23/60 |
| 925,587 | 5/1963 | Great Britain | 23/60 |

*Primary Examiner*—Herbert T. Carter
*Attorney*—Stevens, Davis, Miller & Mosher

[57] ABSTRACT

This invention is directed to a process for preparing alkali metal perborates and may take the form of various embodiments in which hydrogen peroxide is formed in organic solution and reacted with borate. In one embodiment a single reaction step is used wherein an organic compound containing at least two hydrogen atoms capable of being oxidized to hydrogen peroxide is reacted with oxygen in an organic solvent and in the presence of solid alkali metal borate and water wherein the organic solvent is a solvent for the water and the organic compound but not for the alkali metal borate and perborate. In another embodiment the hydrogen peroxide is formed in an organic solvent as described above and subsequently reacted with alkali metal borate in the presence of water in an amount of from more than 1 mole to 5 moles at a temperature of 10°–60° C. In another embodiment the one or two step processes are conducted using less than one mole of alkali metal borate per gram atom active oxygen present or theoretically obtainable from the said organic compound. The process may be conducted wherein the water content is regulated according to the inequalities defined in the claims and utilizing sodium metaborate or disodium tetraborate or mixtures thereof.

33 Claims, No Drawings

PROCESS FOR THE PRODUCTION OF ALKALI METAL PERBORATES

This application is a continuation-in-part of our copending application Ser. No. 594,988 filed Nov. 17, 1966, now abandoned; application Ser. No. 753,763, filed Aug. 19, 1968, now abandoned; and application Ser. No. 837,983 filed May 15, 1969, now abandoned, which is a continuation application of application Ser. No. 551,537, filed May 20, 1966, now abandoned.

Sodium perborate is produced on a technical scale by reaction of hydrogen peroxide with sodium metaborate in an aqueous solution. In the same way other perborates can be obtained. The necessary aqueous solutions of hydrogen peroxide are obtained by electrolytic or organic processes, among which the "anthraquinone process" is the best known. The reaction of borates with hydrogen peroxide of electrolytic origin is often effected already in the same anode chamber in which the hydrogen peroxide is produced. The organic processes have increasingly replaced the electrolytic ones.

The production of hydrogen peroxide according to the organic processes is based upon a simple chemical principle. It has been long known that numerous organic compounds form hydrogen peroxide with molecular oxygen. In the following description such compounds are called autoxidants. The so-called "anthraquinone process" uses alkyl anthrahydroquinones, which when reacted with oxygen yield hydrogen peroxide and the corresponding alkyl anthraquinones. These are again reduced on a catalyst by hydrogen to the hydroquinone. The following oxidation with oxygen again produces hydrogen peroxide to complete the cycle.

The alkyl anthrahydroquinones are only intermediate products and essentially only the combination between oxygen and hydrogen to form hydrogen peroxide results. It is, however, not necessary to build up a cyclic process for production of hydrogen peroxide using the organic synthesis. For instance the reaction between oxygen and isopropanol gives hydrogen peroxide and acetone. The latter can be hydrogenated again or otherwise used, for instance put on the market. The chemical principle indeed is simple, but common to all the organic processes it is a fact that the hydrogen peroxide is produced in a very dilute organic solution and this dilute solution must be converted to a concentrated aqueous solution of hydrogen peroxide. This leads to technological difficulties which determine the costs of the technical process.

To obtain the hydrogen peroxide from the diluted organic solutions these must be extracted or distilled. Both of these methods lead to considerable losses of hydrogen peroxide; in addition the finally recovered aqueous solutions have to be purified. The extraction is only then economical when the distribution relation between the organic solution and water is such that the water takes up the organic components poorly and the hydrogen peroxide very well. This requirement permits for the technical process only certain solvents which actually may not be suitable for the process for other reasons, for instance because of the solvent power for the autoxidant or the high costs. The distillation is accompanied by a great danger of explosion and requires great security precautions and much heat energy.

The present invention relates to processes for the production of perborates, in which the circuitous method involving aqueous hydrogen peroxide solutions is avoided by extracting hydrogen peroxide with solid borates from diluted organic solutions. Under suitable reaction conditions one can, compared with the conventional technical processes for perborate production and in addition to the mentioned simplification of the process, avoid losses of hydrogen peroxide and the purification of its aqueous solutions, choose solvents independent of the distribution relations between organic solutions and water, avoid the danger of explosion and save heat energy.

In French Pat. No. 1,367,499 a process for the production of sodium perborate is disclosed in which at first an organic solution of free hydrogen peroxide is prepared and is then reacted with solid sodium borates with the addition of small amounts of water. The principle of this proposed process, however, is inferable from the reported attempts that have been undertaken, within the framework of the anthraquinone process of hydrogen peroxide production, to eliminate residual hydrogen peroxide, which cannot be extracted with water from a circulating solution at economic cost, by the addition of sodium metaborate and so render it non-detrimental. In the aforementioned French patent it is stated that the amounts of water necessary are at the most 1 mole per mole of hydrogen peroxide. Water in excess should only act as a dilution medium.

Surprisingly, and in contrast to the last-described process, it has been found that the production process for alkali metal perborates in which hydrogen peroxide is prepared in a predominantly organic solution, for example by oxidation with an oxygen-containing gas of an organic compound containing at least two hydrogen atoms which oxidize with the formation of hydrogen peroxide, the organic solution being a solvent for the water and being a non-solvent for alkali metal borates and perborates, followed by reaction of the organic hydrogen peroxide solution with a solid alkali metal borate in the presence of a small amount of water, can be carried out in an economical and technically rewarding manner only when the reaction mixture contains more than one mole of water in relation to the amount of alkali metal borate employed and more than 1 mole of water in relation to the amount of hydrogen peroxide present. Preferably, more than 2 moles of water should be present in the reaction mixture in relation to the amount of alkali metal borate employed.

Investigations into the process have proved that water plays a decisive part in the introduction of the hydrogen peroxide into the borate crystals. As a general rule it can be said that hydrogen peroxide in organic solution forms the perborate with a given alkali metal borate or a given alkali metal borate hydrate all the more readily and rapidly, the greater the total amount of water in the reaction mixture. For the success of the process it is not normally of any importance whether the necessary amount of water enters the reaction mixture in the form of free water or as water of hydration, but a certain minimum concentration of free water in the organic solution should be present, otherwise the rate of reaction may be too slow, at least at the commencement of the reaction. Hydrogen peroxide which is incorporated in an alkali metal borate hydrate liberates water from it.

There is, however, an upper limit to the permissible amount of concentration of water. If the water content of the reaction mixture is increased step-by-step, a gradual coarsening of the grain is observable, until finally the solid product agglomerates to form a sticky mass which may be difficult to remove from the reaction vessel. If the concentration of water is not too high, the sticky masses become solid in air and can be ground. A marked coarsening of the grain alone has an adverse effect, because a proportion of the unchanged borate is entrapped in the grains which means that it is withdrawn from the reaction or requires a disproportionately long time for reaction. If the progressive coarsening of the grain goes too far, traces of solvent are occluded which are difficult to eliminate when the solid product is washed. The residue of such enclosed material that remains in the final product is not significant in weight, but it discolors the perborate, with the result that it does not form completely clear solutions in water and decomposes more readily then otherwise.

In order to obtain the greatest possible amount of perborate from a given volume of reaction solution per unit of time or per charge, the autoxidant selected must be employed in the highest practicable concentration. It has been found that solvents which have good dissolving power for the autoxidants used generally require much water for providing optimal reaction proceedings. This circumstance brings a most important advantage for the process; only now it is possible to use a solvent with good dissolving power. With solvents which are capable of dissolving only up to 0.1 mole of autoxidant per kg., the process can scarcely be practiced on economical lines.

It is necessary that the boron compounds are present during the reaction in the crystalline form. In this case and if the amount of water is not too high, absorption of organic substances by the reaction product can be avoided or takes place only in such manner that the organic impurities can easily be washed out by organic low boiling solvents. If one suspends alkali metal borates in organic hydrogen peroxide solutions which are able to dissolve a substantial part of the borate, one obtains perborates indeed, but these are inferior with respect to purity, color and stability. The used solvents or mixtures of solvents should therefore be non-solvents for the alkali metal borate and also for the resulting perborate. The use of the term "non-solvent" does not exclude solvents which take up traces of borate which are taken up by every solvent. It is not advisable to work with solvents which require for good results more than 5 moles of water per mole of alkali metal borate. Such solvents are so strongly polar that they would dissolve together with the relatively high amount of water too much borate so that the mentioned disadvantages would be obvious. Preferably more than 2 and up to 5 moles of water in relation to the employed mole amount of alkali metal borate should be used. If sodium metaborate is employed it is especially advantageous to use from 2 to 4 moles water per mole $NaBO_2$.

Free water generated during the reaction must be dissolved by the organic solution, i.e., there must not be formed a stable aqueous layer. In the latter case the yield would be small and purity, color and stability of the resulting products would not be satisfactory. The organic solvents of the reaction mixtures must therefore be solvents for the water.

The preferred alkali metal borate is sodium borate, especially sodium metaborate. If it is intended to obtain in one reaction step about 1 gram atom of active oxygen per mole of the employed solid alkali metal borate, then 0.95–1.2 moles of alkali metal borate per mole of hydrogen peroxide is employed. A greater excess of borate makes it possible to recover the existing hydrogen peroxide from the organic solution in a particular good yield. One obtains a product with a relatively low content of active oxygen indeed, but it is possible to react this once more, as is mentioned below. If one uses less borate it is possible to obtain higher contents of active oxygen in the final product, but the hydrogen peroxide present in the organic solution is then not so well exhausted. Commonly 0.8 to 2.0 moles of alkali metal borate per mole of the hydrogen peroxide present is employed.

Increasing of temperature leads to an acceleration of the reaction and to an increase of the solvent power of the employed solvents for the autoxidants. There are, however, limits for the temperature. At temperatures above 60° C. during the reaction with the alkali metal borates decomposition occurs which reduces the economics of the process. Therefore, it is preferred to work at 10° to 60° C.

Examples of especially suitable compounds, containing at least two hydrogen atoms which oxidize with the formation of hydrogen peroxide — autoxidants — are hydroquinones, especially anthrahydroquinone which contains alkyl groups with one to six carbon atoms. Other especially suitable autoxidants are hydrazo compounds, particularly hydrazobenzene, aminophenols and secondary alcohols, such as cyclohexanol. The oxidation is effected with molecular oxygen, i.e., air, or other gaseous mixtures containing molecular oxygen. Some autoxidants form hydrogen peroxide with oxygen only at higher temperatures, for instance the secondary alcohols considerably above 60° C. In such cases the oxidation mixture must be cooled before reaction with the alkali metal borate.

Suitable solvents for the autoxidants include alcohols with from four to 12 carbon atoms, e.g., 2-ethylhexanol, esters of aromatic carbonic acids with methanol e.g., phthalic acid dimethylester, acetic acid esters of cyclohexanol and of its substituted derivatives, ketones having from five to 12 carbon atoms and alkyl groups-substituted benzenes and naphthalenes. The mentioned aromatic hydrocarbons are preferably used in mixtures, because they themselves dissolve the autoxidants poorly on the one hand and decrease on the other hand the polarity and accordingly the solvent power for borates or other solvents.

The autoxidants may themselves act as a solvent, e.g., when the cyclohexanol is used.

When reacting an alkali metal borate with a hydrogen peroxide containing organic solution without further measures, the total content of water in the reaction mixture remains constant during reaction. Accordingly, depending upon whether the borate is employed in the hydrate or non-hydrate form, as a rule the water content of the solid will fall and the concentration of the dissolved water in the organic solution will increase or vice versa.

If an inert gas is passed through the reaction mixture, it is possible by suitable choice of the moisture of the gas to add or to remove water respectively by this expedient during the reaction, thereby making it possible to regulate the water concentration in the organic solution during the reaction. It is possible to obtain the perborate product in particularly high yields and with particularly good properties (i.e., in a powdery to granular form) and with a high reaction velocity if the water concentration in the organic solution, starting from the beginning of the reaction adjusted figures, is kept just so high during the reaction, that no agglomerations of the solid occurs and if the water concentration is lowered, if desired, only so far that formed agglomerations will thereby dissolve again. The agglomeration of the solid is usually easily observed and the water concentration is then regulated corresponding according to the observations by changing the amount or the water partial pressure of the inert gas passed through the reaction mixture.

The so far described methods — as is the process of the previously mentioned French Pat. No. 1,367,499 — are concerned with process conducted in two stages: first the hydrogen peroxide is prepared in the organic solution and then the oxidation mixture is reacted with the alkali metal borate.

It has now been found that alkali metal perborates can be produced in a single reaction step when an organic compound which contains at least two hydrogen atoms oxidizable with formation of hydrogen peroxide is oxidized by an oxygen-containing gas in an organic solvent or in a mixture of organic solvents in the presence of a solid alkali metal borate and in the presence of water, the organic solvent or the mixture being a solvent for the water and the organic compound, but a non-solvent for the alkali metal borate and the perborate. For example, sodium metaborate is suspended in the form of its hydrate or non-hydrate in a solution of an autoxidant and the suspension is oxidized with molecular oxygen, preferably air. At the end of the reaction period the length of which may be longer than but which depends upon the oxidation time of the autoxidant, the solid is filtered or centrifugated, washed with a suitable solvent and dried. This process is more economical than the above described two-stage process.

Use of the one-step process leads to substantial simplifications in the necessary apparatus. By concurrently conducting the oxidation and the reaction of the formed hydrogen peroxide with the alkali metal borate a whole stage of the process is eliminated. Moreover, the considerable amounts of oxygen containing gas which have to be passed through the suspension can effect totally or at least to a substantial part the stirring which is necessary for the reaction with the alkali metal borate. Stirrers which would be necessary if a separate stage for the reaction with the borate were retained, are now unnecessary or at least only needed in a more simple form. Furthermore, the total reaction time is reduced because the perborate formation takes place during the oxidation. The oxidation is assisted by the presence of borate or perborate.

In the one-step process the total yield in relation to the autoxidant employed is also higher. During the oxidation in the two-step process there occur losses of hydrogen peroxide or active oxygen. These losses result partly from the fact that already formed hydrogen peroxide reacts with the autoxidant, e.g., 2-ethylanthrahydroquinone not yet reacted, and partly from the fact that impurities introduced into the solution which have catalytic activity lead to decomposition. If the active oxygen produced by the oxidation is fixed at once by formation of solid perborate, the concentration of hydrogen peroxide in the solution remains low during the total reaction and both the reaction with the autoxidant and the decomposition become negligible.

Further advantages of the one-stage process as compared to the two-stage process are realized in connection with the amounts of water which must be present in the reaction mixture so that the formation of the perborate occurs at a satisfactory velocity, and the perborate is produced in high yield and with good properties. The above discussion regarding the function of the water upon the incorporation of the hydrogen peroxide in the borate crystals is also valid here. Generally, it is desired to recover the perborates in a powdery or granular form.

Preferably alkali metal borate hydrates are employed in the process because these are easy to produce. Anhydrous alkali metal borates can only be prepared from their hydrates with a necessarily higher expenditure for apparatus and production of heat energy.

When hydrogen peroxide is incorporated in a borate hydrate, usually a certain amount of water of crystallization is set free, which, of course, is larger when the amount of water of crystallization in the borate employed is large. The water concentration in the organic solution is increased by the freed water, whereby the further perborate formation is accelerated thus again leading to liberation of water of crystallization. In this way the effect of the water often exceeds the desired acceleration of the perborate formation and leads to a substantial sticking together of the solid. Thus the reaction proceeds so slowly with a suspension of sodium metaborate dihydrate ($NaBO_2 \cdot 2H_2O$) in some solutions having a low water content, the autoxidant content of which is already totally oxidized, that an operation on a technical scale is not feasible. Analogous experiments with slightly wetted, but otherwise similar solutions produce, however, quick reactions but also a total sticking together of the solid.

With the employment of hydrate mixtures of sodium metaborate, which contain on an average more water then the dihydrate, this difficulty occurs particularly often and markedly. The situation with the other alkali metal borate hydrates is similar. Therefore there are cases in which in the two-stage process the reaction products cannot be obtained in a powdery or granular form without regulating the water concentration in the organic solution with the help of an inert gas. The one-stage process is here, however, successful. While in the two-stage process the hydrogen peroxide in the beginning of the reaction with the alkali metal borate hydrate is present in a particularly high concentration, and the reaction — once started — proceeds particularly quickly and therefore the danger of local high concentrations of water and corresponding increased tendency toward sticking exists, in the one-stage process the total hydrogen peroxide for the reaction is formed gradually during the oxidation. High concentrations of water do not occur and the tendency toward sticking together is much lower.

Lastly it is possible in contrast to the two-stage process to use the oxidizing gas, e.g., air, also for the purpose of regulating the water concentration in the organic solution during the reaction.

Autoxidants which are suitable for the two-stage process can usually be employed for the one-stage process too. Exceptions are these autoxidants which can be oxidized only at relatively high temperatures, i.e., substantially above 60° C. with formation of hydrogen peroxide. Secondary alcohols can therefore not be used for the one-stage process.

The other conditions of the one-stage process are similar to the two-stage process. In the following description where no numerical values are given for the one step process those of the two-step process can be adopted. Preferably more than 2 moles of water in relation to the alkali metaborate employed should be present in the starting reaction mixture. It is here advantageous too, to use not more than 5 moles in relation to the mole amount of alkali metal borate. It is especially advantageous to employ 2 to 4 moles of water per one mole of sodium metaborate ($NaBO_2$).

The preferred alkali metal borates are sodium borates, especially sodium metaborate.

If it is intended to fix in the solid about 1 gram atom of active oxygen per mole of the alkali metal borate employed, there should be applied from 1.0 to 1.3 moles of alkali metal borate per mole of hydrogen peroxide theoretically obtained from the autoxidant. Usually 0.6 to 2.0 moles of alkali metal borate per 1 mole of theoretically obtainable hydrogen peroxide are employed. If only minimal sticking of the solid during the reaction is wanted, the water concentration adjusted at the beginning of the reaction in the organic solution should be held nearly constant. This can be effected in the above mentioned manner by the gas passed for oxidation through the solution. It is, however, possible to obtain the perborate product with especially high yield, especially good properties, i.e., in powdery to granular form and at a high reaction rate, if the water concentration in the organic solution, starting from the adjusted figure at the beginning of the reaction, is kept a little lower than the concentration at which an already substantial coarsening of the grains begins. As seen from the outside, this coarsening of the grains appears as agglomerations of the suspended solid. It is desirable therefore to direct the reaction in a manner that the water concentration remains so high that no agglomeration of the solid occurs, and that the water concentration in a given case is lowered so far that the formed agglomerations just redissolve again. The water concentration can be regulated in response to the visual observation by changing the amount of water partial pressure of the gas passed through the reaction mixture.

Perborates are used for the production of detergents and bleaching agents. The purpose of fixing hydrogen peroxide and active oxygen to the borates is to convert these to a solid form. This solid active oxygen containing product can then be added to solid detergents and bleaching agents. In the perborates the active oxygen is the technically most interesting component, the contained borate being only a ballast. This ballast is very expensive and in addition is poisonous. Commercially, until now, all sodium perborate contains per mole of sodium metaborate ($NaBO_2$) at most 1 mole of hydrogen peroxide or 1 gram atom of active oxygen.

There is known a process of producing alkali metal perborates which contain per mole of the employed borate more than 1 mole of hydrogen peroxide or more than 1 gram atom of active oxygen. In this process the borate is evaporated to dryness with a great excess of aqueous hydrogen peroxide under reduced pressure. Operations such as this, however, are hazardous and expensive owing to the pronounced tendency to decomposition of the hydrogen peroxide. These perborates have hitherto been only of scientific interest.

It has now been found that alkali metal perborates can be obtained which contain more than 1 gram atom of active oxygen per mole of the starting borate, if nonaqueous organic solutions of hydrogen peroxide are reacted with solid alkali metal borates and a deficiency of borates is employed in relation to the hydrogen peroxide or the autoxidant. Here also the reaction of the alkali metal borate has to take place in the presence of water though in small amounts — the organic solution must be again a solvent for the water and a non-solvent for the alkali metal borate and the resulting perborate. The necessary organic solutions of hydrogen peroxide are obtained in a favorable manner by oxidizing an organic compound, which contains at least 2 hydrogen atoms which oxidize to form hydrogen peroxide, in a solution of an organic solvent or a mixture of organic solvents by an oxygen-containing gas. Lastly it is possible to use the one-stage and the two-stage processes as they have been described above. The alkali metal perborate products obtained following the just described method consist usually not of a single compound but of a mixture of different perborate compounds which sometimes contain residues of the starting borate. If, e.g., sodium metaborate has been employed, the resulting sodium perborate containing mixtures contain more than 1 gram atom active oxygen per mole of $NaBO_2$ on an average and satisfy the condition of containing active oxygen together with as little as possible of expensive and toxic boron in solid form.

If for instance disodium tetraborate is employed as the starting borate, according to known processes which use aqueous solutions of hydrogen peroxide, 1 mole of hydrogen peroxide is incorporated in 1 mole disodium tetraborate, i.e., to 4 gram atoms of boron and so results in a relatively great amount of ballast. Until now and despite its easy availability and lower price compared with the metaborate per unit of boron, disodium tetraborate has not become important as a starting material for the production of perborates. If disodium tetraborate is employed in the process of this invention a perborate product is obtained in an economical manner. Surprisingly the action of excessive hydrogen peroxide contained in organic solvents liberates boric acid from the disodium tetraborate which dissolves totally or partly. Disregarding the content of water of crystallization, the processes can be written as follows:

$$Na_2B_4O_7 + H_2O_2 \rightarrow (Na_2B_4O_7 \cdot H_2O_2)$$
$$Na_2B_4O_7 \cdot H_2O_2 + H_2O_2 \rightarrow 2\,NaBO_2 \cdot H_2O_2 + B_2O_3$$
$$2\,NaBO_2 \cdot H_2O_2 + H_2O_2 \rightarrow NaBO_2 \cdot 2\,H_2O_2 + NaBO_2 \cdot H_2O_2$$

The boron trioxide does not accumulate as the oxide but as meta or orthoboric acid depending upon the existing water concentration. Starting from disodium tetraborate there can be prepared perborate products in which the ratio (gram atom of active oxygen) : (gram atom of boron) lies above 0.25 by a greater amount, the greater the excess of hydrogen peroxide. Besides the sodium perborate mixture, boric acid is obtained as an additional very valuable product, which can be recovered in a, per se, known manner by shaking out with water from the reaction solution. This, together with the mentioned fact that disodium tetraborate is a very favorable starting product, leads to the economical production of perborate products which have a ratio (gram atom of active oxygen) : (gram atom of boron) smaller than 1.

There can be employed also other alkali metal polyborates like disodium tetraborate with the same result. In any case according to the invention alkali metal perborate-containing mixtures are obtained which contain as an average more than 1 gram atom of active oxygen per $n$ gram atom of alkali metal, $n$ being the basicity of the boric acid on which the starting borate is based.

As starting borates there can be employed also alkali metal perborates or mixtures of alkali metal perborates and alkali metal borates with a lower content of active oxygen as desired. In this way it is possible to produce perborate containing products with especially large content of active oxygen.

If according to the invention alkali metal borates are added in less than molar amounts to the hydrogen peroxide in organic solution, perborates or mixtures of perborates are formed which contain per mole of the starting borate more than 1 gram atom of active oxygen. It is, however, possible to stop the reaction in a short time in which case products are obtained which contain, e.g., only 1 gram atom of active oxygen per mole of the starting borate. Such a procedure is advantageous when it is desired to prepare perborate mixtures of different content of active oxygen or frequently changed content.

Even if reactions using a deficiency of alkali metal borates are reacted until the end of the reaction, the yield in relation to the autoxidant or the hydrogen peroxide employed is lower then with reactions which are conducted with an equimolar amount or an excess of alkali metal borate. In such cases there remains after the separation of the perborate products an organic solution which yet contains considerable amounts of hydrogen peroxide, and indeed the amount is larger when the amount of alkali metal borate that has been employed is smaller in relation to the autoxidant or hydrogen peroxide and the earlier the reaction has been stopped. It is possible to react the still remaining hydrogen peroxide-containing organic solution a second time with an excess of alkali metal borate in the manner described above and obtain with extensive utilization of the residual hydrogen peroxide a product poorer in active oxygen. If this is added as the starting borate to the first reaction, i.e., an excess of hydrogen peroxide, the advantage of an especially complete utilization of the autoxidant employed or the hydrogen peroxide employed can be combined with the advantage of the production of perborate products of especially high content of active oxygen.

The advantages derived from working with a deficiency of alkali metal borate become apparent if 0.9 mole or less alkali metal borate per mole of hydrogen peroxide present or theoretically derivable from the autoxidant is employed. If less than 0.1 mole alkali metal borate are used the yield is so small that the process cannot be conducted economically. Preferably more than 0.1 and less than 0.6 moles of alkali metal borate per mole of hydrogen peroxide present or theoretically derivable from the autoxidant is employed.

Also in reactions with a deficiency of alkali metal borate the preferred borates are sodium metaborate and desodium tetraborate.

In reactions with a deficiency of alkali metal borate the water plays also an important part in the incorporation of the hydrogen peroxide in the borate crystals. If high yields and a final product having as high as possible a content of active oxygen is desired, the water content in the reaction mixtures has to be properly regulated.

If sodium metaborate is the starting borate in a one-stage process at the beginning of the reaction from 1.5 to 4 moles water should be employed per mole of hydrogen peroxide theoretically obtained from the autoxidant. In a two-stage process 1.5 to 4 moles of water per mole of hydrogen peroxide present in the oxidation mixture of the starting reaction mixture should be employed.

If disodium tetraborate is used as the starting borate, in the one-stage process the starting reaction mixture should contain from 2.5 – 7 moles of water per mole of hydrogen peroxide theoretically obtainable from the autoxidant; in the two-stage process there should be employed 2.5 – 7 moles of water per mole of the hydrogen peroxide which is present in the oxidation mixture of the starting reaction mixture.

It is especially advantageous to correlate the water concentration $W_0$ [mole/kg.] in the organic solution of the starting reaction mixtures with the saturation concentration of the water in the corresponding organic solution at the specified reaction temperature. The organic solutions consist as a rule chiefly of an organic solvent or a mixture of organic solvents and of the autoxidant or its oxidation product. Besides this the organic solutions contain small amounts of water and more-or-less hydrogen peroxide. The saturation concentration of the water in the organic solution $W_s$ [mole/kg.] has to be determined in the one-stage process at a time at which it contains the autoxidant but no hydrogen peroxide. In the two-stage process the saturation concentration $W_s$ [mole/kg.] in the organic solution has to be determined at that state at which the solution contains the oxidation product of the autoxidant but no hydrogen peroxide. For the water concentration $W_0$ the water of crystallization content of the starting borate K plays an important part. This figure is ordinarily defined as mole of water per mole of starting borate, e.g., [mole $H_2O$/mole $NaBO_2$] or [mole $H_2O$/mole $Na_2B_4O_7$]. If an alkali metal perborate or a mixture of alkali metal perborates and borates is employed with a smaller (as desired) content of active oxygen as the starting borate, $K$ means the average content of water of crystallization of this starting borate, in relation to the stoichiometrically present sodium metaborate [mole $H_2O$ per mole $NaBO_2$].

In the one-stage process and when sodium metaborate is employed $W_0$ should be selected according to the inequalities [A]

$$\left(\frac{2}{3u} - K + 2.7\right) \cdot \frac{W_s}{10} \leq W_0 \leq \left(\frac{2}{3u}\right) - K + 4.6 \cdot \frac{W_s}{10}$$

In this $u$ means the ratio between the moles of sodium metaborate employed and the moles of hydrogen peroxide theoretically obtainable from the autoxidant in the starting reaction mixture.

In a one-stage process and when disodium tetraborate is employed $W_0$ should be selected according to the inequalities [B]

$$\left(4.5-\frac{K}{3}\right)\cdot\frac{W_s}{10} \leq W_0 \leq \left(8-\frac{K}{3}\right)\cdot\frac{W_s}{10}$$

In a one-stage process and if a mixture containing sodium perborate with a lower content of active oxygen is employed as the starting borate the water concentration $W_0$ should be selected according to the inequalities [C]

$$\left(\frac{2}{3u}-\frac{K}{1-0.7H}+2.7\right)\cdot\frac{W_s}{10} \leq W_0$$

$$\leq \left(\frac{2}{3u}-\frac{K}{1-0.7H}+4.6\right)\cdot\frac{W_s}{10}$$

$u$ means the ratio between the moles of sodium metaborate, (NaBO$_2$) which are stoichiometrically contained in the starting sodium perborate containing mixture and the sum of moles which consists of the hydrogen peroxide or active oxygen which are already included in the starting perborate containing mixture and that which can be theoretically obtained from the autoxidant employed. $H$ means the average content of active oxygen in the employed sodium perborate containing mixture in relation to the sodium metaborate stoichiometrically contained in the starting sodium perborate containing mixture [gram atom of active O/mole NaBO$_2$].

In a two-stage process and when sodium metaborate is employed, $W_0$ should be selected according to the inequalities [D]

$$\left(\frac{2}{3u}-K+2.5\right)\cdot\frac{W_s}{10} \leq W_0 \leq \left(\frac{2}{3u}-K+4.6\right)\cdot\frac{W_s}{10}$$

$u$ means the ratio between the moles of sodium metaborate employed and the moles of the hydrogen peroxide present in the oxidation mixture of the starting reaction mixture.

In a two-stage process and if disodium tetraborate is employed $W_0$ should be selected according to the inequalities [E]

$$\left(4-\frac{K}{3}\right)\cdot\frac{W_s}{10} \leq W_0 \leq \left(8-\frac{K}{3}\right)\cdot\frac{W_s}{10}$$

In a two-stage process and if a sodium perborate containing mixture with a lower content of active oxygen is employed as the starting borate the water concentration $W_0$ should be selected according to the inequalities [F]

$$\left(\frac{2}{3u}-\frac{K}{1-0.7H}+25\right)\cdot\frac{W_s}{10} \leq W_0$$

$$\leq \left(\frac{2}{3u}-\frac{K}{1-0.7H}+4.6\right)\cdot\frac{W}{10}$$

$u$ means herein the ratio between the moles of stoichiometrically contained sodium metaborate (NaBO$_2$) in the starting sodium perborate containing mixture and the sum of moles which consists of the hydrogen peroxide or active oxygen already contained in the starting perborate containing mixture and that hydrogen peroxide which is present in the oxidation mixture of the starting reaction mixture. Also, $H$ means the average content of active oxygen in the sodium perborate containing mixture in relation to the sodium metaborate stoichiometrically contained in the starting sodium perborate containing mixture [gram atom active O/mole NaBO$_2$].

It should be pointed out that also in processes which work especially with a deficiency of alkali metal borate the conditions are generally the same as they were described for the one- and two-stage processes. It is therefore also of particular advantage in the one-stage process to regulate the water concentration in the organic solution during the reaction by means of the oxygen containing gas passed through the reaction mixture, and in the two-stage process by an inert gas passed through the reaction mixture. As described above the amount and the content of water vapor should be regulated so high that just no agglomeration of solid occurs or formed agglomerations just dissolve again.

In all processes described here it is advantageous after separation of the final perborate product and possibly after repeating the reaction, to convert the remaining solution by, per se, known reduction processes into a solution for use again in the described processes if desired after recovering several byproducts. The process can also be conducted continuously, e.g., in a cascade of stirred vessels.

The more powdery the employed alkali metal borates are and the more care one uses in adding the solid to the solution in as good distribution as possible, the greater is the yield at a given reaction time. On principle the described reactions proceed with coarse material too, but then the reaction time is exclusively determined by diffusion and the reactions become uneconomical because of very long reaction times. A specific definition concerning the size of the granules cannot be stated. In general it is advantageous to prepare the starting alkali metal borates so that they do not contain particles bigger than 300$\mu$ and have an average particle diameter smaller than 150$\mu$.

When using a double reaction, e.g., to obtain a perborate product with an especially high content of active oxygen and to realize an especially good utilization of the employed autoxidant or, the employed hydrogen peroxide, and intermediate grinding of the solids that are still poor in active oxygen after the first reaction is highly recommended.

The present invention is further illustrated by the following examples. In the examples the parts mentioned are parts by weight and the temperatures are in degrees centigrade. Where gases are forced through the reaction mixtures, these gases prior to their introduction into the reaction vessels are substantially loaded with the vapor of the solvent or solvent mixture of the organic solution so as to substantially correspond to the partial pressure of the solvent above the reaction mixture involved.

EXAMPLE 1

Solutions of 2-ethyl-, 2-tert.butyl-anthrahydroquinone and of a mixture of the isomeric 2-amylanthrahydroquinones were prepared by dissolving the corresponding 2-alkylanthraquinones in the desired solvent or mixture of solvents and hydrogenating it in the presence of palladium precipitated on aluminum oxide with anhydrous hydrogen at 30° to 50° C. Not all of the 2-alkylanthraquinone contained in the solution was reduced. After reaching the desired degree of hydrogenation the solution was filtered until it was free of the catalyst, and the filtrate was stored under pure nitrogen until used. The filtrates contained throughout less than 0.05 moles of water per kg. solution. The solutions thus obtained are hereinafter called the "starting solutions."

Fundamentally it would be possible to use the anthrahydroquinone itself, but it and the anthraquinone are poorly soluble in organic solutions. The solubility is increased by the alkyl substituent groups which have not other substantial influence on the further use of the obtained solutions. Therefore it is possible to use other than the expressly mentioned alkyl anthrahydroquinones with the same success.

EXAMPLE 2

For the preparation of solutions of 2-alkylanthrahydroquinones with a higher content of water the starting solutions of example 1 were stirred violently in a special vessel below pure nitrogen with the necessary amount of water until this had been dissolved completely by the organic solution.

EXAMPLE 3

For the production of organic solutions of hydrogen peroxide, air with a water vapor partial pressure of less than 0.05 mm. Hg were pumped through fine holes in the bottom into a vessel thermostatically maintained at 20° – 50° C. A "starting solution" of example 1 was put in the vessel and was oxidized until the dark solution had become bright yellow. This solution was stirred violently with the necessary amount of water until the water had been dissolved by the organic solution.

EXAMPLES 4 a–h

Utilizing the two stage process, M parts of an oxidized and wetted "starting solution" prepared according to example 3 was introduced into a vessel with a stirrer, which was thermostatically controlled at a temperature of $\delta°$ C. The solution contained $s_0$ moles of hydrogen peroxide, $w_0$ moles of water and $e$ moles of 2-alkyl anthraquinone per kg. and had been prepared from $h_0$ moles of 2-alkyl-anthrahydroquinone per kg. To the solution A parts of powdery sodium metaborate (analysis figures: $m_0$ gram atoms of Na/kg., corresponding K moles water of crystallization per mole of $NaBO_2$) were added; the intensity of stirring was regulated so that the solid was divided homogeneously in the liquid.

After $t$ minutes the reaction mixture was filtered. The filtrate contained $s_E$ moles of hydrogen peroxide per kg. The solid was washed several times in benzene and subsequently liberated from adsorbed residues of benzene by a short vacuum treatment.

The P parts of the produce contained $m_E$ gram atoms of sodium and $x$ gram atoms of active oxygen per kg.

The values for the various symbols set forth above and the results obtained in these examples 4 a–h are set forth in the following Table I.

Solvent: mixture of 25 parts by weight "Shellsol AB", an aromatic fraction with BP 180° – 220°C., and 75 parts by weight 2-ethyl-hexanol-1
Original autoxidant: 2-tert.-butylanthrahydroquinone;
Temperature: 40°C.
$M = 1450$; $s_0 = 0.186$; $e = 0.340$; $w_0 = 0.462$
$A = 68$; $m_0 = 8.34$; $K = 2.15$;
$t = 40$
$s_E = 0.009$
$P = 71$; $m_e = 7.88$; $x = 3.55$ (0.45 gram atom act. O/gram atom Na)
$u = 1.05$ mole $Na_2B_4O_7$/mole $H_2O_2$
  4.51 mole $H_2O$/mole $Na_2B_4O_7$
  4.74 mole $H_2O$/mole $H_2O_2$
yield 93.5 percent of the theory in relation to $H_2O_2$

EXAMPLE 7

The oxidation apparatus was a cylindrical glass vessel. The bottom had numerous fine holes through which gaseous oxygen could be forced. The exit gas after permeating the liquid layer passed through a reflux condenser in which the condensable parts were condensed. The apparatus was almost completely submerged in the reaction chamber in a thermostable glycerine bath.

TABLE I

| Examples | Solvents | 2-alkyl- | Temperature, $\delta°$ | M | $h_0$ | $s_0$ | $e$ | $W_0$ | A |
|---|---|---|---|---|---|---|---|---|---|
| 4a | Dimethyl o-phthalate | 2-ethyl- | 20 | 40.51 | 0.187 | 0.183 | 0.422 | 0.427 | 0.5242 |
| 4b | do | do | 20 | 40.00 | 0.188 | 0.184 | 0.423 | 0.035 | 0.8100 |
| 4c | do | do | 40 | 40.00 | 0.204 | 0.200 | 0.423 | 0.213 | 0.9820 |
| 4d | Mixture of 3 parts per volume xylene isomeric mixture and 4 parts per volume cyclohexyl acetate. | do | 20 | 26.25 | 0.148 | 0.146 | 0.300 | 0.130 | 0.2635 |
| 4e | Mixture of 1 part per volume xylene isomeric mixture and 5 parts per volume cyclohexyl acetate. | do | 20 | 24.23 | 0.234 | 0.231 | 0.458 | 0.310 | 0.4131 |
| 4f | Cyclohexyl acetate | 2-tert.-butyl | 40 | 40.00 | 0.180 | 0.176 | 0.400 | 0.080 | 0.9530 |
| 4g | do | 2-amyl-(isomeric mixture) | 60 | 100.0 | 0.205 | 0.200 | 0.400 | 0.290 | 1.700 |
| 4h | do | do | 60 | 100.0 | 0.205 | 0.203 | 0.400 | 0.090 | 3.980 |

| Examples | $m_0$ | K | t | $s_E$ | P | $m_E$ | x | $u$ moles $NaBO_2$/$H_2O_2$ | Moles $H_2O$/$NaBO_2$ | Moles $H_2O$/$H_2O_2$ | Yield related to $H_2O_2$ (percent) |
|---|---|---|---|---|---|---|---|---|---|---|---|
| 4a | 14.73 | 0.11 | 140 | 0.006 | 0.858 | 8.95 | 8.25 | 1.04 | 2.35 | 2.45 | 95.5 |
| 4b | 10.00 | 1.90 | 80 | 0.011 | 0.929 | 8.69 | 7.40 | 1.10 | 2.07 | 2.28 | 93.5 |
| 4c | 9.65 | 2.10 | 100 | 0.008 | 1.060 | 8.90 | 7.08 | 1.19 | 3.00 | 3.57 | 94 |
| 4d | 13.91 | 0.34 | 90 | 0.008 | 0.405 | 9.04 | 8.87 | 0.95 | 1.27 | 1.22 | 93.5 |
| 4e | 13.91 | 0.34 | 90 | 0.009 | 0.643 | 8.89 | 8.25 | 1.03 | 1.65 | 1.70 | 95 |
| 4f | 7.39 | 3.86 | 5 | 0.020 | 0.917 | 7.65 | 6.50 | 1.00 | 4.32 | 4.32 | 85 |
| 4g | 9.85 | 1.99 | 15 | 0.024 | 0.988 | 8.38 | 8.75 | 0.84 | 3.53 | 3.43 | 87 |
| 4h | 9.85 | 1.99 | 15 | 0.007 | 4.429 | 8.80 | 4.40 | 1.93 | 2.22 | 4.29 | 96 |

EXAMPLE 5

The two stage process was conducted in the manner of examples 4 a–h with the difference that instead of sodium metaborate, powdery potassium metaborate was employed. (Analysis figures: $m_0$ gram atoms K/kg., corresponding K moles water of crystallization per mole $KBO_2$)
Solvent: cyclohexyl acetate
Original autoxidant: 2-ethylanthrahydroquinone
Temperature: 40°C.
$m = 150.0$; $h_0 = 0.330$; $s_0 = 0.322$; $e = 0.400$; $w_0 = 0.210$;
$A = 5.13$; $m_0 = 9.41$; $K = 1.36$;
$t = 40$
$s_E = 0.019$
$p = 5.46$; $m_E = 8.80$; $x = 8.10$
$v = 1.00$ mole $KBO_2$/mole $H_2O_2$
  2.01 mole $H_2O$/mole $KBO_2$
  2.01 mole $H_2O$/mole $H_2O_2$
yield: 91.5 percent of theory in relation to $H_2O_2$

EXAMPLE 6

A two stage process was conducted according to the method of examples 4 a–h with the difference that instead of sodium metaborate, powdery disodium tetraborate was employed. (Analysis figures: $m_0$ gram atoms Na/kg., corresponding K moles water of crystallization per mole $Na_2B_4O_7$)

The oxidation vessel was filled with 200 parts of cyclohexanol, 1 part 1,1'-dihydroxy dicyclohexyl peroxide and 0.2 parts of Victawet 35B (a polyphosphate manufactured by Victor Co., U.S.A.) were introduced into the oxidation vessel, and 150 liters of undried oxygen were forced per hour and kg. of cyclohexanol through the liquid. The reaction temperature was held at 95°C. When the acid content of the oxidation mixture began to rise noticeably after 6 hours, (this period may be, according to the impurities contained in the cyclohexanol, 5 – 10 hours) the sum of the contents of hydrogen peroxide and of peroxidic compounds which can dissociate hydrogen peroxide under the conditions of the following perborate formation was 0.3 moles/kg. At this time the total mixture was placed in a stirred vessel and cooled to 25°C. Now 6.3 parts of finely divided sodium metaborate containing water of crystallization were added with vigorous stirring at this temperature. This sodium metaborate has been obtained from 8.27 parts $NaBO_2 \cdot 4H_2O$ by drying at 90°C. After stirring for 3 hours at the said temperature the liquid was decanted. The remaining solid was reduced to small pieces, washed with a little ethanol and dried. 8.0 parts with 9.91 percent by weight of active oxygen were obtained.
$u = 1.0$ mole $NaBO_2$/mole $H_2O_2$
  $>2.2$ mole $H_2O$/mole $NaBO_2$
  $>2.2$ mole $H_2O$/mole $H_2O_2$ yield ≈ 82 percent of the theory related to $H_2O_2$ and to peroxidic compounds which can dissociate $H_2O_2$

EXAMPLES 8 a–d

Using a two stage process, the oxidized and wetted "starting solution" according to example 3 was reacted with solid sodium metaborate.

A glass vessel provided with a bottom with fine holes for the passing in of nitrogen and a stirrer was thermostatically maintained at $\delta°C$. In this vessel were placed $M$ parts of the oxidized and wetted "starting solution" containing $w_0$ moles water, $s_0$ moles hydrogen peroxide and $e$ moles 2-alkyl-anthraquinone per kg. This "starting solution" had contained originally $h_0$ moles 2-alkyl anthrahydroquinone per kg. To this solution A parts of powdery sodium metaborate (analysis figures $m_0$ gram atoms Na/kg., corresponding $K$ moles water of crystallization per mole $NaBO_2$) were added. The intensity of stirring was regulated so that the solid was divided homogeneously in the liquid at the lowest possible streaming velocity of the nitrogen. The streaming velocity was maintained sufficiently high so that the contents of the reaction vessel did not come out through the fine holes at the bottom of the vessel.

The streaming velocity 1 (liter per hour and kg. solution) and the water vapor partial pressure $P_n$ (torr) of the nitrogen could be changed very easily. When the reaction proceeded so that the solid agglomerated to loose flakes, this was just countered by forcing in more dry nitrogen. Where agglomerations failed to appear or appeared only very late, water was brought into the reaction mixture by more wet nitrogen until flakes just appeared which were dissolved again by lowering the amount or the water content of the nitrogen. Conducting the process so as to be on the verge of the agglomeration, the reaction products appeared in a powdery to fine granular form; they were white and high yields were obtained with high reaction rates. In the place of a visual observation there could be used a nephelometric measurement by a photocell, by which the streaming velocity or the water vapor partial pressure $P_N$ of the nitrogen and by that the water concentration of the organic solution is regulated. This has particular advantages with rapid reactions. The regulation of the reactions and their result can be improved by setting a program for the streaming velocity or the water vapor partial pressure of the nitrogen. This program is established by separate experiments.

After $t$ minutes the reaction mixture was filtered. The filtrate contained $s_E$ moles hydrogen peroxide per kg. The solid was washed several times with benzene and finally liberated from adsorbed residues of benzene by a short vacuum treatment.

The P parts of the product contained $m_E$ gram atoms of sodium and $x$ grams atoms of active oxygen per kg.

Instead of nitrogen any other inert gas or inert gas mixture, e.g., air can be used.

The values for the various symbols set forth above and the results obtained in these examples 8 a–d are set forth in the following Table II:

EXAMPLE 9

A two stage process was conducted according to the method of examples 8 a–d with the difference that instead of sodium metaborate, finely divided potassium metaborate was employed (analysis figures: $m_0$ gram atoms K/kg., corresponding $K$ moles water of crystallization per mole $KBO_2$).

Solvent: cyclohexyl acetate
Original autoxidant: 2-ethylanthrahydroquinone
Temperature: 40°C.
regulation by the nitrogen stream: water vapor partial pressure $p_N$:
0 – 45 mm.; streaming velocity 1 : 500 Nl/h.kg.
$M = 150.0$; $h_0 = 0.330$; $s_0 = 0.322$; $e = 0.400$; $w_0 = 0.220$
$A = 5.13$; $m_0 = 9.41$; $K = 1.36$
$t = 30$
$s_E = 0.003$
$P = 5.58$; $m_E = 8.59$; $x = 8.40$
$u = 1.00$ mole $KBO_2$/mole $H_2O_2$
2.04 mole $H_2O$/mole $KBO_2$
2.04 mole $H_2O$/mole $H_2O_2$
yield 97 percent of theory related to $H_2O_2$

EXAMPLES 10 a–j

Using a one step process "starting solutions" of examples 1 or 2 were oxidized in the presence of solid sodium metaborate.

Through a vessel, thermostatically controlled at $\delta$ °C. air with a water vapor partial pressure of $p_L$ mm. was pumped through the fine holes in the bottom. One after the other $A$ parts of finely divided sodium metaborate (analysis figures: $m_0$ gram atoms of Na/kg. corresponding $K$ moles water of crystallization per mole $NaBO_2$) and $M$ parts "starting solution" from the examples 1 and 2 were added to the vessel. The solution contained $h_0$ moles 2-alkyl anthrahydroquinone, $w_0$ moles of water and $e$ moles 2-alkyl anthraquinone per kg. The charging opening of the reaction vessel was closed, the gas delivery pipe was combined with a rotameter and the gas velocity set at 1 liter per hour and kg. of solution.

The sodium metaborate divided quickly in the dark solution. After $t$ minutes the reaction mixture was filtered. The yellow filtrate contained $s_E$ moles of hydrogen peroxide per kg. The solid was washed several times with benzene and finally released from adsorbed residues of benzene by a short aspiration.

The P parts of the product contained $m_E$ gram atoms of sodium and $x$ grams atoms of active oxygen per kg.

Instead of air, other gas mixtures consisting of molecular oxygen and inert gases, and also oxygen alone can be used.

The values for the various symbols set forth above and the results obtained in these examples 10 a–j are set forth in the

TABLE II

| Examples | Solvent | 2-alkyl- | Temperature, $\delta°$ | Regulation by the nitrogen stream | | $M$ | $h_0$ |
|---|---|---|---|---|---|---|---|
| | | | | Water vapor partial pressure $P_N$ | Streaming velocity 1 | | |
| 8a | Diisobutyl ketone | 2-tert.-butyl | 40 | 0 | 50–400 | 150 | 0.260 |
| 8b | Dimethyl o-phthalate | 2-ethyl- | 40 | 0–30 | 700 | 120 | 0.244 |
| 8c | Cyclohexyl acetate | 2-amyl-(isomeric mixture) | 60 | 0 | 50–400 | 100.0 | 0.205 |
| 8d | do | do | 60 | 0–70 | 400 | 100.0 | 0.205 |

| Examples | $s_0$ | $e$ | $w_0$ | $A$ | $m_0$ | $K$ | $t$ | $s_E$ | $P$ | $m_E$ | $x$ | μmoles $NaBO_2$/$H_2O_2$ | Moles $H_2O$/$NaBO_2$ | Moles $H_2O$/$H_2O_2$ | Yield related to $H_2O_2$ (percent) |
|---|---|---|---|---|---|---|---|---|---|---|---|---|---|---|---|
| 8a | 0.251 | 0.500 | 0.080 | 3.80 | 9.91 | 1.95 | 20 | 0.008 | 4.07 | 9.20 | 8.95 | 1.00 | 2.35 | 2.35 | 96 |
| 8b | 0.242 | 0.500 | 0.180 | 3.07 | 10.03 | 1.88 | 30 | 0.004 | 3.45 | 8.90 | 8.17 | 1.06 | 2.58 | 2.74 | 97 |
| 8c | 0.200 | 0.400 | 0.320 | 1.700 | 9.85 | 1.99 | 10 | 0.018 | 2.023 | 8.26 | 8.90 | 0.84 | 3.90 | 3.27 | 90 |
| 8d | 0.203 | 0.400 | 0.110 | 3.980 | 9.85 | 1.99 | 10 | 0.002 | 4.470 | 8.75 | 4.45 | 1.93 | 2.27 | 4.93 | 98 | following Table III. The mentioned "Shellsol AB" is an aromatic fraction of the B.P. 180°-220°C.

$s_E = 0.008$
$p = 7.00; m_E = 6.06; x = 2.72$

TABLE III

| Examples | Solvent | 2-alkyl- | Temperature. $\delta$ °C. | $H_2O$ partial pressure $p_L$ |
|---|---|---|---|---|
| 10a | Dimethyl-o-phthalate | 2-ethyl | 20 | 1 |
| 10b | do | do | 20 | 5 |
| 10c | Mixture of 1 part per volume mixture of xylene isomers and 1 part per volume mixture of methyl-cyclohexylacetate isomers. | do | 40 | 24 |
| 10d | do | do | 20 | 16 |
| 10e | do | do | 10 | 7 |
| 10f | Dimethyl-o-phthalate | do | 57 | 45 |
| 10g | do | do | 50 | 45 |
| 10h | Mixture of 25 parts per wieght "Shellsol-AB" and 75 parts per weight 2-ethylhexanol-1 | do | 40 | 11 |
| 10i | 1-phenylethanol-1 | do | 40 | 31 |
| 10j | Mixture of 25 parts per weight 1-methyl-naphthaline and 75 parts per weight 2-ethylhexanol-1 | 2-tert.-butyl | 40 | 28 |

| Examples | Gas-velocity 1 | M | $h_o$ | e | $w_o$ | A | $m_o$ | K | t | $s_E$ | P | $m_E$ | x | $\mu$ moles $NaBO_2$/ hydroquinone | Moles $H_2O$/ $NaBO_2$ | Moles $H_2O$/ hydroquinone | Yield related to hydroquinone (percent) |
|---|---|---|---|---|---|---|---|---|---|---|---|---|---|---|---|---|---|
| 10a | 350 | 40.00 | 0.200 | 0.223 | 0.042 | 1.138 | 7.49 | 3.75 | 90 | 0.006 | 1.015 | 8.41 | 7.62 | 1.07 | 3.95 | 4.23 | 96.5 |
| 10b | 350 | 35.27 | 0.200 | 0.223 | 0.042 | 0.9194 | 8.21 | 3.11 | 100 | 0.010 | 0.903 | 8.35 | 7.36 | 1.07 | 3.31 | 3.54 | 94.5 |
| 10c | 200 | 41.20 | 0.0950 | 0.0925 | 0.022 | 0.4302 | 10.00 | 1.90 | 30 | 0.002 | 0.460 | 9.23 | 8.02 | 1.10 | 2.11 | 2.32 | 94.5 |
| 10d | 200 | 34.72 | 0.0950 | 0.0925 | 0.043 | 0.2467 | 14.73 | 0.11 | 100 | 0.012 | 0.365 | 9.99 | 7.80 | 1.10 | 0.52 | 0.56 | 86.5 |
| 10e | 200 | 34.72 | 0.0670 | 0.0723 | 0.066 | 0.3151 | 14.73 | 0.11 | 150 | 0.0005 | | | 4.70 | 1.99 | 0.60 | 1.19 | |
| 10f | 390 | 141 | 0.248 | 0.252 | 0.322 | 3.53 | 10.00 | 1.90 | 35 | 0.015 | 3.75 | 9.38 | 8.72 | 1.01 | 3.19 | 3.22 | 93.5 |
| 10g | 380 | 141 | 0.250 | 0.250 | 0.250 | 3.90 | 10.00 | 1.90 | 40 | 0.017 | 4.10 | 9.46 | 7.71 | 1.11 | 2.80 | 3.11 | 89.5 |
| 10h | 105 | 132 | 0.196 | 0.144 | 0.333 | 2.80 | 9.96 | 1.92 | 50 | 0.021 | 3.00 | 9.24 | 7.48 | 1.08 | 3.50 | 3.78 | 86.5 |
| 10i | 750 | 93 | 0.233 | 0.267 | 0.575 | 2.28 | 9.96 | 1.92 | 40 | 0.018 | 2.41 | 9.42 | 8.08 | 1.05 | 4.28 | 4.50 | 90 |
| 10j | 150 | 30 | 0.170 | 0.170 | 0.212 | 0.586 | 9.47 | 2.21 | 40 | 0.012 | 0.617 | 9.02 | 7.26 | 1.09 | 3.38 | 3.67 | 88 |

EXAMPLE 11

A one stage process was conducted according to the method of examples 10 a–j with the difference that in the place of sodium metaborate, finely divided potassium metaborate was employed (analysis figures: $m_0$ gram atoms K/kg., corresponding $K$ moles water of crystallization per mole $KBO_2$).

Solvent: cyclohexyl acetate
Autoxidant: 2-ethylanthrahydroquinone
Temperature: 40°C.
Water vapor partial pressure $p_L$: 10
Gas velocity 1 : 500
$M = 150.0; h_0 = 0.330; e = 0.070; w_0 = 0.240$
$A = 5.26; m_0 = 9.41; K = 1.36$
$t = 35$
$s_E = 0.005$
$p = 5.62; m_E = 8.79; x = 8.45$
$u = 1.00$ mole $KBO_2$/mole-hydroquinone
  2.09 mole $H_2O$/mole $KBO_2$
  2.09 mole $H_2O$/mole-hydroquinone
yield: 96 percent of theory related to -hydroquinone

EXAMPLE 12

A one step process was conducted according to the method of examples 10 a–j with the difference that in the place of sodium metaborate, finely divided disodium tetraborate was employed (analysis figures: $m_0$ gram atoms Na/kg., corresponding $K$ moles of water of crystallization per mole $Na_2B_4O_7$).

Solvent: dimethyl-o-phthalate
Autoxidant: 2-ethylanthrahydroquinone
Temperature: 40°C.
Water vapor partial pressure: $p_L$ : 10
Gas streaming velocity 1 : 570
$M = 121.2; h_0 = 0.170; e = 0.330; w_0 = 0.205$
$A = 7.90; m_0 = 5.37; k = 9.53$
$t = 70$
$u = 1.03$ moles $Na_2B_4O_7$/mole = hydroquinone
  10.7 moles $H_2O$/mole $Na_2B_4O_7$
  11.0 moles $H_2O$/mole -hydroquinone
yield: 92.5 percent of theory related to -hydroquinone

EXAMPLES 13 a and b

A one stage process was conducted according to the method of examples 10 a–j with the difference that the water vapor partial pressure $p_L$ of the air was not held constant. This parameter could be changed very quickly.

When the reaction was conducted so that when the solid agglomerated to loose flakes, this was just countered by lowering of the water vapor partial pressure $p_L$. When the solid failed to agglomerate or such agglomerations appeared only very late, water was added to the reaction mixture by increasing $p_L$ until flakes appeared which were afterwards just dissolved again by lowering of the water content of the air. Thus, by maintaining the reaction on the verge of agglomeration, the reaction products formed in powdery to fine granular form; they were white and high yields were obtained with high reaction rates. In the place of a visual observation there could be a nephelometric measurement by a photocell as described in the preamble of examples 8 a–d. Observation and measurement here must be put through in thin layers because of the dark color of the organic solutions. The regulation of the reactions and their result can be improved by setting a program for the water vapor partial pressure $p_L$ as described in example 8 a–d.

After $t$ minutes the reaction mixture was filtered. The filtrate contained $s_E$ moles hydrogen peroxide per kg. The solid was washed several times with benzene and finally liberated from adsorbed residues of benzene by a short aspiration.

The P parts of the product contained $m_E$ gram atoms of sodium and $x$ gram atoms of active oxygen per kg.

The reactions can be controlled in a manner analogous to examples 8 a–d by the gas velocity 1, but there must be considered when working on one stage that the oxidation rate is influenced by this too.

The values for the various symbols set forth above and the results obtained in these examples 13 a and b are set forth in the following Table IV.

EXAMPLES 14 a–f

Using a two stage process $M$ parts of "starting solution" oxidized and wetted according to example 3 were placed into a stirred vessel which was thermostatically maintained at a temperature of $\delta$ °C. The solution contained $s_O$ moles of hydrogen peroxide, $w_O$ moles of water and $e$ moles of 2-alkyl-anthraquinone per kg. A parts of finely divided sodium metaborate (analysis figures: $m_O$ gram atoms Na/kg., corresponding $K$ moles water of crystallization per mole NaBO$_2$) were added to the solution, the intensity of the stirring being regulated such that the solid was distributed homogenously in the solution.

After $t$ minutes the reaction mixture was filtered. The filtrate contained $s_E$ moles of hydrogen peroxide per kg. The solid was washed several times with benzene and finally liberated from adsorbed residues of benzene by a short vacuum evaporation.

The $P$ parts of the product contained $m_E$ gram atoms of sodium and $x$ gram atoms of active oxygen per kg.

The values for the various symbols set forth above and the results obtained in these examples 14 a–f are set forth in the following Table V.

EXAMPLES 15 a–d

A two stage process was conducted according to the method of examples 14 a–f with the difference that instead of sodium metaborate, finely divided disodium tetraborate was employed. (Analysis figure: $m_O$ gram atom Na/kg. corresponding $K$ moles water of crystallization per mole Na$_2$B$_4$O$_7$). After separating of the sodium perborate containing product, boric acid could be obtained from the filtrate.

The $P$ parts of the product contained $m_E$ gram atoms of sodium, $b_E$ gram atoms of boron and $x$ gram atoms of active oxygen per kg.

For the isolation of the boric acid the total filtrate was shaken out with $C_a$ parts of water at 60°C. After separation of the layers the aqueous phase was evaporated to $C_b$ parts and then orthoboric acid was brought to crystallization by cooling to 5°C. After filtration, washing with ice cold water and drying $B$ parts of white ortho boric acid were obtained. The organic phase could be used for a new hydrogenation and oxidation reaction.

The values for the various symbols set forth above and the results obtained in these examples 15 a–d are set forth in the following Table VI.

TABLE IV

| Examples | Solvent | 2-alkyl- | Temperature, $\delta$ °C. | Water vapor partial pressure $p_L$ | Gas velocity $l$ | M | $h_O$ | $e$ | $w_O$ | A | $m_O$ | K |
|---|---|---|---|---|---|---|---|---|---|---|---|---|
| 13a | Cyclohexyl acetate | 2-ethyl | 60 | 0–90 | 400 | 200.6 | 0.200 | 0.200 | 0.100 | 4.50 | 8.90 | 2.58 |
| 13b | do | 2-amyl-(mixture of isomers) | 60 | 0–50 | 400 | 200.0 | 0.203 | 0.197 | 0.150 | 7.96 | 9.85 | 1.99 |

| Examples | t | $s_E$ | P | $m_E$ | x | μmoles NaBO$_2$/ hydroquinone | Moles H$_2$O/ NaBO$_2$ | Moles H$_2$O/ hydroquinone | Yield related to hydroquinone (percent) |
|---|---|---|---|---|---|---|---|---|---|
| 13a | 20 | 0.006 | 4.35 | 9.20 | 8.85 | 1.00 | 3.08 | 3.08 | 96 |
| 13b | 15 | 0.003 | 8.85 | 8.85 | 4.45 | 1.93 | 2.37 | 4.58 | 97 |

TABLE V

| Example | Solvent | 2-alkyl | Temperature, $\delta$ °C. | M | $s_O$ | $e$ | $w_O$ | A |
|---|---|---|---|---|---|---|---|---|
| 14a | Mixture of 25 parts per weight "Shellsol AB" and 75 parts per weight 2-ethylhexanol-1. | 2-ethyl | 40 | 1,500 | 0.162 | 0.350 | 0.340 | 17.78 |
| 14b | do | do | 40 | 1,500 | 0.174 | 0.350 | 0.350 | 16.80 |
| 14c | do | do | 40 | 1,500 | 0.178 | 0.340 | 0.610 | 5.40 |
| 14d | do | do | 40 | 1,500 | 0.181 | 0.340 | 0.560 | 10.60 |
| 14e | Cyclohexyl acetate | 2-tert. butyl | 40 | 150 | 0.215 | 0.400 | 0.196 | 0.175 |
| 14f | do | do | 40 | 100 | 0.190 | 0.400 | 0.330 | 0.256 |

| Examples | $m_O$ | K | t | $s_E$ | P | $m_E$ | x | μ moles NaBO$_2$/ H$_2$O$_2$ | Moles H$_2$O/ NaBO$_2$ | Moles H$_2$O/ H$_2$O$_2$ | $w_S$ according to [D] | Range for $w_O$ according to [D] | Yield related to H$_2$O$_2$ (percent) |
|---|---|---|---|---|---|---|---|---|---|---|---|---|---|
| 14a | 10.25 | 1.76 | 40 | 0.028 | 21.25 | 8.54 | 9.30 | 0.75 | 4.56 | 3.42 | 1.13 | 0.18–0.42 | 81.5 |
| 14b | 10.70 | 1.54 | 40 | 0.036 | 21.00 | 8.51 | 9.62 | 0.69 | 4.46 | 3.08 | 1.13 | 0.22–0.46 | 77.5 |
| 14c | 14.83 | 0.09 | 40 | 0.093 | 9.45 | 8.42 | 12.80 | 0.30 | 11.52 | 3.46 | 1.13 | 0.52–0.76 | 45 |
| 14d | 14.83 | 0.09 | 40 | 0.053 | 17.80 | 8.79 | 10.54 | 0.58 | 5.44 | 3.16 | 1.13 | 0.41–0.65 | 69 |
| 14e | 9.21 | 2.38 | 60 | 0.099 | 2.02 | 7.94 | 10.40 | 0.50 | 4.20 | 2.10 | 0.56 | 0.08–0.20 | 64 |
| 14f | 14.83 | 0.09 | 60 | 0.123 | 0.468 | 8.10 | 13.40 | 0.20 | 8.77 | 1.75 | 0.56 | 0.32–0.44 | 33 |

TABLE VI

| Examples | Solvent | 2-alkyl | Temperature, $\delta$ °C. | M | $s_O$ | $e$ | $w_O$ | A | $m_O$ |
|---|---|---|---|---|---|---|---|---|---|
| 15a | Mixture of 25 parts per weight "Shellsol AB" and 75 parts per weight 2-ethylhexanol-1. | 2-ethyl | 40 | 1,500 | 0.188 | 0.340 | 0.520 | 50.8 | 8.3 |
| 15b | do | do | 40 | 1,500 | 0.183 | 0.340 | 0.500 | 14.5 | 8.34 |
| 15c | Cyclohexyl acetate | do | 40 | 1,500 | 0.218 | 0.400 | 0.195 | 37.6 | 6.97 |
| 15d | do | do | 40 | 1,700 | 0.200 | 0.400 | 0.410 | 21.85 | 8.60 |

| Examples | K | t | $s_E$ | P | $m_E$ | $b_E$ | x | $C_a/C_b$ | B | μmoles Na$_2$B$_4$O$_7$/ H$_2$O$_2$ | Moles H$_2$O/ Na$_2$B$_4$O$_7$ | Moles H$_2$O/ H$_2$O$_2$ | $w_S$ according to [E] | Range for $w_O$ according to [E] | Yield related to total H$_2$O$_2$ (percent) |
|---|---|---|---|---|---|---|---|---|---|---|---|---|---|---|---|
| 15a | 2.15 | 40 | 0.012 | 56.2 | 7.50 | | 4.65 | | | 0.75 | 5.83 | 4.37 | 1.13 | 0.37–0.83 | 92.5 |
| 15b | 2.15 | 40 | 0.061 | 16.9 | 7.12 | 9.96 | 10.63 | 400/30 | 1.45 | 0.22 | 14.60 | 3.21 | 1.13 | 0.37–0.83 | 65.5 |
| 15c | 4.78 | 60 | 0.043 | 37.9 | 6.85 | 11.53 | 6.85 | 1,500/50 | 3.5 | 0.40 | 7.01 | 2.81 | 0.56 | 0.13–0.36 | 79.5 |
| 15d | 1.74 | 60 | 0.063 | 24.05 | 7.73 | 10.95 | 9.55 | 1,700/100 | 3.9 | 0.28 | 9.15 | 2.56 | 0.56 | 0.19–0.41 | 67.7 |

EXAMPLE 16

A two stage process is conducted according to the method of examples 14 a–f with the difference that instead of sodium metaborate, a finely divided sodium perborate containing mixture was employed (analysis figures: $m_O$ gram atoms of Na/kg., $b_O$ gram atoms of boron/kg. and $x_O$ gram atoms of active oxygen/kg., corresponding K moles water of crystallization and H gram atoms of active oxygen per mole $NaBO_2$. The P parts of the product contained $m_E$ gram atoms of sodium, $b_E$ gram atoms of boron and $x$ gram atoms of active oxygen per kg.

The values for the various symbols set forth above and the results obtained in these examples 16 a and b are set forth in the following Table VII.

EXAMPLES 17 a–d

Using a one stage process "starting solutions" of examples 1 or 2 were oxidized in the presence of solid sodium metaborate.

Through a vessel thermostatically maintained at $\delta$ °C., air with a water vapor pressure of $p_L$ mm. was pumped through the fine holes in the bottom. One after the other A parts of finely divided sodium metaborate (analysis figures: $m_O$ gram atoms of Na/kg., corresponding K moles of water of crystallization per mole $NaBO_2$) and M parts of "starting solution" of examples 1 or 2 were placed in the vessel. The solution contained $h_O$ moles 2-alkylanthrahydroquinone, $w_O$ moles water and $e$ moles 2-alkylanthraquinone per kg. The charging opening of the reaction vessel was closed, the gas delivery pipe combined with a rotameter and the gas velocity was regulated to 1 liter per hour and kg. solution.

The sodium metaborate distributed itself quickly in the dark solution. After t minutes the reaction mixture was filtered. The yellow filtrate contained $s_E$ moles of hydrogen peroxide per kg. The solid was washed several times with benzene and at last liberated from the residues of adsorbed benzene by a short period of aspiration.

The P parts of the product contained $m_E$ gram atoms of sodium and $x$ gram atoms of active oxygen per kg.

Like air, other gas mixtures consisting of molecular oxygen and inert gases and also oxygen alone can be used.

As in examples 13 a and b the results can be improved by regulating the water concentration in the organic solutions by the gas mixture used for the oxidation.

The values for the various symbols set forth above and the results obtained in these examples 17 a–d are set forth in the following Table VIII.

EXAMPLES 18 a–d

A one stage process was conducted according to the method of examples 17 a–d with the difference that in the place of sodium metaborate, finely divided disodium tetraborate was employed (analysis figures: $m_O$ gram atoms of Na/kg., corresponding K moles water of crystallization per mole $Na_2B_4O_7$) and that after separating the sodium perborate-containing product, boric acid was obtained from the filtrate.

The P parts of the product contained $m_E$ gram atoms of sodium, $b_E$ gram atoms of boron and $x$ gram atoms of active oxygen per kg.

For the isolation of the boric acid after the separation of the sodium perborate-containing mixture, the total filtrate was shaken out with $C_a$ parts of water at 60°C. After separation of the layers the aqueous phase was evaporated to $C_b$ parts and then ortho boric acid brought to crystallization by cooling to 5°C. After filtration, washing with ice cold water and after drying, B parts of white ortho boric acid were obtained. The organic phase could be used for a new hydrogenation, oxidation and reaction.

TABLE VII

| Example | Solvent | 2-alkyl- | Temperature, $\delta$ °C. | M | $s_O$ | $e$ | $w_O$ | A | $m_O=b_O$ | $x_O$ | K |
|---|---|---|---|---|---|---|---|---|---|---|---|
| 16 a | Mixture of 25 parts per weight "Shellsol AB" and 75 parts per weight 2-ethylhexanol-1. | 2-ethyl- | 40 | 1,440 | 0.155 | 0.330 | 0.480 | 24.5 | 9.42 | 7.00 | 0.84 |
| 16 b | Cyclohexyl acetate | do | 55 | 150 | 0.280 | 0.400 | 0.210 | 1.89 | 9.80 | 7.04 | 0.65 |

| Example | H | t | $s_E$ | P | $m_E=b_E$ | x | μmoles $NaBO_2/H_2O_2$ | Moles $H_2O/NaBO_2$ | Moles $H_2O/H_2O_2$ | $w_8$ according to [F] | Range for $w_O$ according to [F] | Yield related to total $H_2O_2$ (percent) |
|---|---|---|---|---|---|---|---|---|---|---|---|---|
| 16 a | 0.74 | 40 | 0.043 | 27.0 | 8.52 | 12.10 | 0.58 | 3.83 | 2.24 | 1.13 | 0.21–0.45 | 83 |
| 16 b | 0.72 | 30 | 0.176 | 2.14 | 8.60 | 12.87 | 0.34 | 2.35 | 0.79 | 0.68 | 0.21–0.36 | 50 |

TABLE VIII

| Example | Solvent | 2-alkyl- | Temperature, $\delta$ °C. | $H_2O$ partial pressure $p_L$ | Gas velocity 1 | M | $h_O$ | $e$ | $w_O$ | A | $m_O$ |
|---|---|---|---|---|---|---|---|---|---|---|---|
| 17a | Mixture of 25 parts per weight "Shellsol AB" and 75 parts per weight 2-ethylhexanol-1. | 2-ethyl- | 40 | 42 | 200 | 1,500 | 0.172 | 0.168 | 0.330 | 13.86 | 10.25 |
| 17b | Mixture of 25 parts per weight "Shellsol AB" and 75 parts per weight 2-ethylhexanol-1. | do | 40 | 43 | 200 | 1,500 | 0.172 | 0.168 | 0.350 | 7.56 | 10.25 |
| 17c | Mixture of 25 parts per weight "Shellsol AB" and 75 parts per weight 2-ethylhexanol-1. | do | 40 | 41 | 200 | 1,500 | 0.169 | 0.171 | 0.300 | 18.50 | 10.25 |
| 17d | Cyclohexyl acetate | do | 57 | 40 | 500 | 150 | 0.335 | 0.065 | 0.280 | 1.03 | 9.73 |

| Example | K | t | $s_E$ | P | $m_E$ | x | μmoles $NaBO_2$/hydroquinone | Moles $H_2O/NaBO_2$ | Moles $H_2O$/hydroquinone | $w_8$ according to [A] | Range for $w_O$ according to [A] | Yield related to hydroquinone (percent) |
|---|---|---|---|---|---|---|---|---|---|---|---|---|
| 17a | 1.76 | 40 | 0.041 | 16.1 | 8.74 | 11.95 | 0.55 | 5.25 | 2.89 | 1.13 | 0.25–0.46 | 74.5 |
| 17b | 1.76 | 40 | 0.085 | 9.20 | 8.38 | 13.12 | 0.30 | 8.54 | 2.57 | 1.13 | 0.35–0.58 | 47 |
| 17c | 1.76 | 40 | 0.025 | 21.1 | 8.93 | 10.00 | 0.76 | 4.13 | 3.13 | 1.13 | 0.21–0.42 | 84.5 |
| 17d | 2.06 | 45 | 0.214 | 1.26 | 7.95 | 13.17 | 0.20 | 8.25 | 1.64 | 0.70 | 0.28–0.41 | 33 |

The values for the various symbols set forth above and the results obtained in these examples 18 a-d are set forth in the following Table IX.

66.5 percent of the theoretical total active oxygen in the product in relation to the originally total present $H_2O_2$ or active oxygen.

TABLE IX

| Example | Solvent | 2-alkyl- | Temperatures δ °C. | $H_2O$ partial pressure $p_L$ | Gas velocity 1 | M | $h_0$ | e | $w_0$ | A | $m_0$ | K | t |
|---|---|---|---|---|---|---|---|---|---|---|---|---|---|
| 18a | Dimethyl-o-phthalate | 2-ethyl- | 40 | 20 | 540 | 1,204 | 0.248 | 0.252 | 0.200 | 28.10 | 5.37 | 9.50 | 60 |
| 18b | 2-phenylethanol | do | 40 | 35 | 820 | 1,500 | 0.284 | 0.216 | 1.450 | 80.3 | 6.97 | 4.78 | 50 |
| 18c | Cyclohexyl acetate | do | 40 | 30 | 450 | 1,500 | 0.246 | 0.154 | 0.215 | 75.4 | 8.34 | 2.15 | 45 |
| 18d | do | do | 40 | 30 | 450 | 1,500 | 0.255 | 0.145 | 0.368 | 27.5 | 8.34 | 2.15 | 60 |

| Example | $s_E$ | P | $m_E$ | $b_E$ | x | $C_a/C_b$ | B | μ moles $Na_2B_4O_7/$ hydroquinine | Moles $H_2O/$ $Na_2B_4O_7$ | Moles $H_2O/$ hydroquinine | $w_s$ according to [B] | range for $w_0$ according to [B] | Yield related to hydroquinine (percent) |
|---|---|---|---|---|---|---|---|---|---|---|---|---|---|
| 18a | 0.053 | 23.65 | 6.35 | 10.18 | 9.68 | | | 0.25 | 12.7 | 3.21 | 0.98 | 0.13-0.47 | 76.5 |
| 18b | 0.039 | 82.5 | 6.79 | 11.81 | 4.38 | | | 0.66 | 12.6 | 8.28 | 4.49 | 1.30-2.87 | 85.0 |
| 18c | 0.024 | 88.5 | 7.08 | 13.82 | 3.60 | | | 0.85 | 3.18 | 2.71 | 0.56 | 0.20-0.40 | 89.2 |
| 18d | 0.094 | 33.0 | 6.94 | 9.52 | 7.22 | 1,500/100 | 5.2 | 0.30 | 6.95 | 2.09 | 0.56 | 0.20-0.40 | 62.4 |

EXAMPLES 19 a and b

A one stage process was conducted according to the method of examples 17 a-d with the difference that instead of sodium metaborate a finely divided sodium perborate-containing mixture was employed (analysis figures: $m_0$ gram atoms of Na/kg., $b_0$ gram atoms of boron/kg. and $x_0$ gram atoms of active oxygen/kg., corresponding K moles water of crystallization and H gram atoms of active oxygen per mole $NaBO_2$). The P parts of the product contained $m_E$ gram atoms of sodium, $b_E$ gram atoms of boron and x gram atoms of active oxygen per kg.

The values for the various symbols set forth above and the results obtained in these examples 19 a and b are set forth in the following Table X.

EXAMPLE 21

A one step process was conducted according to the method of examples 13 a and b with the difference that instead of sodium metaborate, a finely divided sodium perborate containing mixture was employed (analysis figures: $m_0$ gram atoms Na/kg., $b_0$ gram atoms boron/kg. and $x_0$ gram atoms active oxygen/kg. corresponding K moles water of crystallization and H gram atoms active oxygen per mole $NaBO_2$). The P parts of the product contained $m_E$ gram atoms of sodium, $b_E$ gram atoms of boron and x gram atoms of active oxygen per kg.

Solvent: cyclohexyl acetate
Autoxidant: 2-ethylanthrahydroquinone
Temperature: 55°C.

TABLE X

| Example | Solvent | 2-alkyl- | Temperature δ °C. | $H_2O$ partial pressure $p_L$ | Gas velocity 1 | M | $h_0$ | e | $w_0$ | A | $m_0=b_0$ |
|---|---|---|---|---|---|---|---|---|---|---|---|
| 19a | Mixture of 25 parts per weight "Shellsol-AB" and 75 parts per weight 2-ethyl-hexanol-1. | 2-ethyl- | 40 | 46 | 200 | 1,500 | 0.175 | 0.275 | 0.450 | 21.58 | 9.14 |
| 19b | Cyclohexyl acetate | do | 55 | 60 | 500 | 150 | 0.224 | 0.176 | 0.205 | 2.23 | 9.80 |

| Example | $x_0$ | K | H | t | $s_E$ | P | $m_E=b_E$ | x | μmoles $NaBO_2/$ hydroquinone | Moles $H_2O/$ $NaBO_2$ | Moles $H_2O$ hydroquinone | $w_s$ according to [C] | Range for $w_0$ according to [C] | Yield related to total $H_2O_2$ (percent) |
|---|---|---|---|---|---|---|---|---|---|---|---|---|---|---|
| 19a | 8.50 | 0.67 | 0.93 | 40 | 0.072 | 24.50 | 8.00 | 13.60 | 0.44 | 4.09 | 1.81 | 1.13 | 0.26-0.48 | 75 |
| 19b | 7.04 | 0.65 | 0.72 | 26 | 0.106 | 2.61 | 8.35 | 12.66 | 0.44 | 2.06 | 0.91 | 0.68 | 0.20-0.33 | 67 |

EXAMPLE 20

A two stage process was conducted according to the method of examples 8 a-d with the difference that instead of sodium metaborate, a finely divided sodium perborate containing mixture was employed (analysis figures: $m_0$ gram atoms of Na/kg., $b_0$ gram atoms of boron/kg. and $x_0$ gram atoms of active oxygen/kg., corresponding K moles water of crystallization and H gram atoms of active oxygen per mole $NaBO_2$). The P parts of the product contained $m_E$ gram atoms of sodium, $b_E$ gram atoms of boron and x gram atoms of active oxygen per kg.

Solvent: cyclohexyl acetate
Original autoxidant: 2-ethyl-anthrahydroquinone
Temperature: 55°C.
regulation by the nitrogen stream: water vapor partial pressure $P_N$ 30 – 90 mm.; streaming velocity 1 = 500 l/h.kg.

$M=150$  $A=2.19$  $t=24$  $x=12.62$
$h_0=0.224$  $m_0=b_0=9.80$  $s_E=0.103$
$s_0=0.220$  $x_0=7.04$  $P=2.56$
$e=400$  $K=0.65$  $m_E=b_E=8.38$
$w_0=0.205$  $H=0.72$
$u = 0.44$ moles $NaBO_2$/moles total $H_2O_2$
  2.08 moles water/moles $NaBO_2$
  0.92 moles water/moles total $H_2O_2$
$w_s$ = according to: 0.68 moles $H_2O$/kg.
range for $w_0$ according to: 0.18 –0.33 moles $H_2O$/kg. Yield:

regulation by the gas stream: water vapor partial pressure $p_L$ 20 –90 mm.; gas velocity 1: 500 l/h.kg $M=150$  $m_0=b_0=9.80$  $s_E=0.101$
$h_0=0.224$  $x_0=7.04$  $P=2.66$
$e=0.176$  $k=0.65$  $m_E=b_E=8.20$
$w_0=0.225$  $H=0.72$  $x=12.80$
$A=2.23$  $t=26$
$u = 0.44$ moles $NaBO_2$/sum of moles
  (active oxygen + -hydroquinone)
  2.20 moles water/moles $NaBO_2$
  0.97 moles water/sum of moles
  (active oxygen + -hydroquinone)
$w_s$ = according to: 0.68 moles $H_2O$/kg.

range for $w_0$ according to: 0.20 – 0.33 moles $H_2O$/kg. Yield: 69 percent of the theoretical total active oxygen in the product, in relation to the originally present sum (active oxygen + -hydroquinone).

What is claimed is:

1. A process for preparing alkali metal perborates in a single reaction step which comprises oxidizing with an oxygen-containing gas an organic compound containing at least two hydrogen atoms capable of being oxidized to hydrogen peroxide at a temperature below about 60° C., said oxidation being conducted in an organic solvent or mixture of organic solvents and in the presence of a solid alkali metal borate and water, said organic solvent or mixture being a solvent for the water and said compound but a non-solvent for alkali metal borate and perborates.

2. A process according to claim 1 wherein the compound containing at least two hydrogen atoms is a member selected from the group consisting of hydroquinones and aminophenols.

3. A process according to claim 1 wherein said alkali metal borate is a sodium metaborate and wherein from 0.6 to 2.0 moles of sodium metaborate are employed per mol of theoretically obtainable hydrogen peroxide.

4. A process according to claim 1 wherein, at the beginning of the reaction, the reaction mixture contains at least 2 moles of water per mole of said solid alkali metal borate.

5. A process according to claim 1 wherein said compound, which contains at least two hydrogen atoms, is an anthrahydroquinone substituted with alkyl groups having one to five carbon atoms, wherein said alkali metal borate is sodium metaborate employed in an amount of from 1.0 to 2.0 mole per mole of theoretically obtainable hydrogen peroxide, wherein the reaction mixture at the beginning of the reaction contains from 2 to 4 moles of water per mole of the sodium metaborate employed and wherein the water concentration in the organic solution is regulated during the reaction by the moisture content and amount of said oxygen containing gas.

6. A process according to claim 1 wherein said alkali metal perborates are sodium perborates which contain as an average more than 1 gram atoms of active oxygen per mole of sodium perborate product calculated as sodium metaborate wherein said solid alkali metal borate is a sodium metaborate and wherein the starting reaction mixture contains from 0.1–0.9 moles of sodium metaborate and from 1.5 to 4 moles of water per mole of theoretically obtainable hydrogen peroxide.

7. A process according to claim 6 in which the water concentration in the organic solution is regulated during the reaction by the oxygen containing gas forced through the reaction mixture by the amount and the water vapor content of said oxygen containing gas.

8. A process according to claim 1 wherein said alkali metal perborates are sodium perborates which contain as an average more than 1 gram atoms of active oxygen per mole of sodium perborate product calculated as sodium metaborate, wherein said solid alkali metal borate is sodium metaborate, wherein the starting reaction mixture contains from 0.1 to 0.9 moles of sodium metaborate and from 1.5 to 4 moles of water per mole of theoretically obtainable hydrogen peroxide, and wherein the water concentration $W_0$ in the organic solution in the starting reaction mixture is in the range set forth by the following inequalities:

$$\left(\frac{2}{3u}-K+2.7\right)\cdot\frac{Ws}{10} \leq W_0 \leq \left(\frac{2}{3u}-K+4.6\right)\cdot\frac{Ws}{10}$$

in which $W_s$ = saturation concentration of water in the organic solution containing the autoxidant and no hydrogen peroxide at the intended reaction temperature $u$ = the ratio of the moles of sodium metaborate employed to the moles of hydrogen peroxide theoretically obtainable from the autoxidant in the starting reaction mixture $K$ = water of crystallization content of the sodium metaborate employed.

9. A process according to claim 1 wherein said alkali metal perborates are sodium perborates which contain as an average more than 1 gram atom of active oxygen per $n$ gram atoms of sodium, $n$ being the basicity of the boric acid on which the starting borate is based, wherein said solid alkali metal borate is disodium tetraborate and wherein the starting reaction mixture contains from 0.1 to 0.9 moles of disodium tetraborate and from 2.5 to 7 moles of water per mole of theoretically obtainable hydrogen peroxide.

10. A process according to claim 1 wherein said alkali metal perborates are sodium perborates which contain as an average more than 1 gram atom of active oxygen per $n$ gram atoms of sodium, $n$ being the basicity of the boric acid on which the starting borate is based, wherein said alkali metal borate is disodium tetraborate and wherein the starting reaction mixture contains from 0.1 to 0.9 moles disodium tetraborate per mole of theoretically obtainable hydrogen peroxide and wherein the water concentration $W_0$ (moles/kg) in the organic solution of the starting reaction mixture is within the range set forth by the following inequalities:

$$\left(4.5-\frac{K}{3}\right)\cdot\frac{Ws}{10} \leq W_0 \leq \left(8-\frac{K}{3}\right)\cdot\frac{Ws}{10}$$

in which $W_s$ = saturation concentration of water in the organic solution containing the autoxidant and no hydrogen peroxide at the intended reaction temperature $K$ = water of crystallization content of the disodium tetraborate employed.

11. A process for increasing the active oxygen content of mixtures consisting of sodium perborates and sodium metaborate up to sodium perborates which contain as an average more than 1 gram atom of active oxygen per mole of sodium perborate product calculated as sodium metaborate in a single reaction step which comprises oxidizing with an oxygen containing gas an organic compound containing at least two hydrogen atoms capable of being oxidized to hydrogen peroxide at a temperature below about 60° C., said oxidation being conducted in an organic solvent or mixture of organic solvents and in the presence of water and a mixture consisting of sodium perborates and sodium metaborate wherein the starting reaction mixture contains from 0.1 to 0.9 moles of sodium perborates and sodium metaborate calculated as sodium metaborate per mole of the sum consisting of the hydrogen peroxide already present in the starting sodium perborates and sodium metaborate and that theoretically obtainable and wherein said organic solvent or mixture of organic solvents is a solvent for the water and said compound but a non-solvent for sodium perborates and sodium metaborate and wherein the water concentration $W_0$ in the organic solution of the starting reaction mixture is within the range set forth by the following inequalities:

$$\left(\frac{2}{3u}-\frac{K}{1-0.7H}+2.7\right)\cdot\frac{Ws}{10} \leq W_0 \leq \left(\frac{2}{3u}-\frac{K}{1-0.7H}+4.6\right)\cdot\frac{Ws}{10}$$

in which the solid starting mixture consisting of sodium perborates and sodium metaborate is calculated as sodium metaborate:

$W_s$ = saturation concentration of water in the organic solution containing the autoxidant and no hydrogen peroxide at the intended reaction temperature $u$ = the ratio between the moles of sodium metaborate ($NaBO_2$) and the sum of moles consisting of the hydrogen peroxide already included in the solid starting mixture and of that hydrogen peroxide which can be theoretically obtained from the autoxidant employed $K$ = average water of crystallization content of the solid starting mixture per mole of sodium metaborate $H$ = average content of hydrogen peroxide in the solid starting mixture per mole of sodium metaborate.

12. A process according to claim 11 in which the water concentration of the solution is regulated during the reaction by the oxygen containing gas forced through the reaction mixture by the amount and the water vapor content of the said oxygen containing gas.

13. A one-step process for the production of sodium perborates, which contain as an average more than 1 gram atom of active oxygen per $n$ gram atoms of sodium, $i$ being the basicity of the boric acid on which the starting borate is based, comprising oxidizing an organic compound with at least two hydrogen atoms oxidizable with formation of hydrogen peroxide at a temperature below about 60° C. in an organic solvent or a mixture of organic solvents by an oxygen containing gas and reacting simultaneously with below 0.6 and more than 0.1 moles of solid disodium tetraborate per mole of theoretically obtainable hydrogen peroxide in the presence of 2.5 to 7 moles of water per mole of hydrogen peroxide, the said organic solvent or the said mixture of organic solvents being a solvent for the water and said compound but a non-solvent for disodium tetraborate and sodium perborates.

14. A one-step process for the production of sodium perborates, which contain as an average more than 1 gram atom of active oxygen per mole of sodium perborate product calculated as sodium metaborate, comprising oxidizing an organic compound with at least two hydrogen atoms oxidizable with formation of hydrogen peroxide at a temperature below about 60° C. in an organic solvent or a mixture of organic solvents by an oxygen containing gas and reacting simultaneously with below 0.6 and more than 0.1 moles of a solid sodium metaborate per mole of theoretically obtainable hydrogen peroxide in the presence of 1.5 to 4 moles water per mole of hydrogen peroxide, said organic solvent or said mixture of organic solvents being a solvent for water and said compound but a non-solvent for sodium metaborate and sodium perborates.

15. A process for the production of perborates of alkali metals comprising forming hydrogen peroxide in a solution of an organic solvent or mixture of organic solvents, said organic solvent or mixture being a solvent for water, but a non-solvent for alkali metal borate and perborate, and subsequently but directly reacting said hydrogen peroxide solution at a temperature of 10°–60° C. with a solid alkali metal borate in the presence of water in an amount of from more than 1 mole to 5 moles of water per mole of alkali metal borate employed and more than 1 mole of water per mole of hydrogen peroxide present.

16. A process according to claim 15, in which the reaction mixture contains from more than 2 moles of water up to 5 moles of water per mole of alkali metal borate.

17. A process according to claim 15, in which the reaction mixture contains from 0.8 to 2.0 moles of alkali metal borate per mole of hydrogen peroxide present.

18. A process according to claim 15 in which the solvent or mixture of solvents is selected from the group consisting of alcohols having from four to 12 carbon atoms, esters of aromatic carboxylic acids with methanol, esters of acetic acid with cyclohexanol, ketones having from five to 12 carbon atoms, alkyl benzenes and alkyl naphthalenes.

19. A two-step process for the production of perborates of alkali metals comprising oxidizing with an oxygen containing gas a compound containing at least two hydrogen atoms which is capable of being oxidized to hydrogen peroxide in a solution of an organic solvent or mixture of organic solvents, said organic solvent or mixture being a solvent for the water and said compound, but a non-solvent for alkali metal borate and perborate, and subsequently but directly reacting said hydrogen peroxide solution at a temperature of 10°–60° C. with a solid alkali metal borate in the presence of water in an amount of from more than 1 mole up to 5 moles of water per mole of alkali metal borate employed and more than 1 mole of water per mole of hydrogen peroxide present.

20. A process according to claim 19 in which the compound containing at least two hydrogen atoms is an anthrahydroquinone, which has as substituents alkyl groups with one to six carbon atoms, in which said alkali metal borate is a sodium metaborate, employed in an amount from 0.8 to 2.0 moles per mole of hydrogen peroxide present and in which the reaction mixture contains at the beginning of the reaction from 2 to 4 moles of water per mole of sodium metaborate employed.

21. A process according to claim 20 in which the water concentration in the organic solution is regulated by passing therethrough an inert gas of predetermined amount and water content during the reaction with the sodium metaborate.

22. A two-step process for the production of sodium perborates which contain as an average more than 1 gram atom of active oxygen per $n$ gram atoms of sodium, $n$ being the basicity of the boric acid on which the starting borate is based, comprising oxidizing an organic compound with at least two hydrogen atoms oxidizable with formation of hydrogen peroxide in an organic solvent or a mixture of organic solvents by an oxygen containing gas and reacting subsequently but directly with less than 0.6 and more than 0.1 moles of solid disodium tetraborate per mole of theoretically obtainable peroxide in the presence of 2.5 to 7 moles of water per mole of hydrogen peroxide, the said organic solvent or the said mixture of organic solvents being a solvent for the water and the said compound but a non-solvent for the disodium tetraborate and the perborate.

23. A two-step process for the production of sodium perborates which contain as an average more than 1 gram atom of active oxygen per mole of sodium perborate product calculated as sodium metaborate comprising oxidizing an organic compound with at least two hydrogen atoms oxidizable with formation of hydrogen peroxide in an organic solvent or a mixture of organic solvents by an oxygen containing gas and reacting subsequently but directly with less than 0.6 and more than 0.1 moles of solid sodium metaborate per mole of theoretically obtainable hydrogen peroxide in the presence of 1.5 to 4 moles water per mole of hydrogen peroxide, the said organic solvent or the said mixture of organic solvents being a solvent for the water and the said compound but a non-solvent for the sodium metaborate and the perborate.

24. A two-step process for increasing the active oxygen content of mixtures consisting of sodium perborates and sodium metaborate up to sodium perborates which contain as an average more than 1 gram atom of active oxygen per mole of sodium perborate product calculated as sodium metaborate comprising oxidizing an organic compound with at least two hydrogen atoms oxidizable with formation of hydrogen peroxide in a solution of an organic solvent or a mixture of organic solvents with an oxygen containing gas, the said organic solvent or the mixture of solvents being a solvent for the water and the said compound and being a non-solvent for sodium metaborate and sodium perborates, and then reacting the obtained hydrogen peroxide subsequently but directly in the presence of water with a starting mixture of sodium perborates and sodium metaborate containing the stoichiometric equivalent of from 0.1 to 0.9 moles of sodium metaborate per mole of the sum of the hydrogen peroxide contained in the solid starting mixture and the solution and wherein in the starting reaction mixture the water concentration $W_0$ in the organic solution is within the range set forth by the following inequalities:

$$\left(\frac{2}{3u} - \frac{K}{1-0.7H} + 2.5\right) \cdot \frac{Ws}{10} \leq W_0 \leq \left(\frac{2}{3u} - \frac{K}{1-0.7H} + 4.6\right) \cdot \frac{Ws}{10}$$

in which the solid starting mixture consisting of sodium perborates and sodium metaborate is calculated as sodium metaborate:

$W_s$ = saturation concentration of water in the organic solution free of hydrogen peroxide at the intended reaction temperature $U$ = the ratio between the moles of sodium metaborate ($NaBO_2$) and the sum of moles consisting of the hydrogen peroxide already included in the solid starting mixture and of that hydrogen peroxide which is present in the oxidized organic solution of the starting reaction mixture $K$ = average water of crystallization content of the solid starting mixture per mole of sodium metaborate $H$ = average content of hydrogen peroxide in the solid starting mixture per mole of sodium metaborate.

25. A process according to claim 24 in which the water concentration in the organic solution is regulated during the reaction with the sodium perborate containing mixture by the gas or the gas mixture passed through the reaction mixture by the amount and the water vapor content of the said gas or gas mixture.

26. A process for the production of sodium perborates which contain as an average more than 1 gram atom of active oxygen per mole of sodium perborate product calculated as sodium metaborate, comprising oxidizing an organic compound containing at least 2 hydrogen atoms oxidizable with formation of hydrogen peroxide in an organic solvent or a mixture of organic solvents, the solvent or the mixture of solvents being a solvent for the water but a non-solvent for sodium metaborate and sodium perborates, and subsequently but directly reacting the oxidation mixture with sodium metaborate, the starting reaction mixture containing from 0.1 to 0.9 moles of sodium metaborate and from 1.5 to 4 moles of water per mole of hydrogen peroxide.

27. A process according to claim 26 wherein said organic compound containing at least 2 hydrogen atoms is an alkyl derivative of anthrahydroquinone wherein said alkyl groups have from one to six carbon atoms.

28. A process according to claim 26 in which in the said starting reaction mixture the water concentration $W_0$ in the organic solution is within the range set forth by the following inequalities:

$$\left(\frac{2}{3u}-K+2.5\right)\cdot\frac{W_s}{10} \leq W_0 \leq \left(\frac{2}{3u}-K+4.6\right)\cdot\frac{W_s}{10}$$

in which $W_s$ = saturation concentration of water in the organic solution free of hydrogen peroxide at the intended reaction temperature $u$ = the ratio between the moles of sodium metaborate employed and the moles of the hydrogen peroxide present in the oxidized organic solution of the starting reaction mixture $K$ = water of crystallization content of the sodium metaborate employed.

29. A process according to claim 26 in which the water concentration of the organic solution is regulated during the reaction with the sodium metaborate by an inert gas or gas mixture passed through the reaction mixture by the amount and the water vapor content of this said inert gas or gas mixture.

30. A process for the production of sodium perborates which contain as an average more than 1 gram atom of active oxygen per $n$ gram atoms of sodium, $n$ being the basicity of the boric acid on which the starting borate is based, comprising oxidizing an organic compound containing at least two hydrogen atoms oxidizable with formation of hydrogen peroxide in an organic solvent or a mixture of organic solvents, the solvent or the mixture of solvents being a solvent for the water but a non-solvent for disodium tetraborate and sodium perborates, and reacting the oxidation mixture subsequently but directly with disodium tetraborate, the starting reaction mixture containing from 0.1 to 0.9 moles of disodium tetraborate and from 2.5 to 7 moles of water per mole of hydrogen peroxide.

31. A process according to claim 30 in which the water concentration of the organic solution is regulated during the reaction with the disodium tetraborate by an inert gas or gas mixture passed through the reaction mixture by the amount and the water vapor content of the inert gas or gas mixture.

32. A process for the production of sodium perborates which contain as an average more than 1 gram atom of active oxygen per $n$ gram atoms of sodium, $n$ being the basicity of the boric acid on which the starting borate is based, comprising oxidizing an organic compound containing at least two hydrogen atoms oxidizable with formation of hydrogen peroxide in an organic solvent or a mixture of organic solvents and reacting the oxidation mixture subsequently but directly with disodium tetraborate, the organic solvent or the mixture of solvents being a solvent for water, but a non-solvent for disodium tetraborate and sodium perborates, the starting reaction mixture containing from 0.1 to 0.9 moles of disodium tetraborate per mole of hydrogen peroxide, and wherein the water concentration $W_0$ (moles/kg) in the organic solution of the starting reaction mixture is within the range set forth by the following inequalities:

$$\left(4-\frac{K}{3}\right)\cdot\frac{W_s}{10} \leq W_0 \leq \left(8-\frac{K}{3}\right)\cdot\frac{W_s}{10}$$

in which $W_s$ = saturation concentration of water in the organic solution free of hydrogen peroxide at the intended reaction temperature $K$ = water of crystallization content of the disodium tetraborate employed.

33. A two-step process for the production of sodium perborates which contain as an average more than 1 gram atom of active oxygen per mole of sodium perborate product calculated as sodium metaborate comprising oxidizing an organic compound with at least two hydrogen atoms oxidizable with formation of hydrogen peroxide in a solution of an organic solvent or a mixture of solvents with an oxygen containing gas, the said organic solvent or the mixture of solvents being a solvent for the water and the said compound and being a non-solvent for sodium metaborate and sodium perborates, and then reacting the obtained hydrogen peroxide subsequently but directly in the presence of water with from 0.1 to 0.9 moles of sodium metaborate per mole of hydrogen peroxide present, wherein the water content $W_0$ in the organic solution of the starting reaction mixture is within the range set forth by the following inequalities:

$$\left(\frac{2}{3u}-K+2.5\right)\cdot\frac{W_s}{10} \leq W_0 \leq \left(\frac{2}{3u}-K+4.6\right)\cdot\frac{W_s}{10}$$

in which $W_s$ = saturation concentration of water in the organic solution free of hydrogen peroxide at the intended reaction temperature $u$ = the ratio between the moles of sodium metaborate employed and the moles of the hydrogen peroxide present in the oxidation mixture of the starting reaction mixture $K$ = water of crystallization content of the sodium metaborate employed.

* * * * *